(12) United States Patent
Propheter-Hinckley et al.

(10) Patent No.: US 11,125,087 B2
(45) Date of Patent: *Sep. 21, 2021

(54) NEEDLED CERAMIC MATRIX COMPOSITE COOLING PASSAGES

(71) Applicant: Raytheon Technologies Corporation, Farmington, CT (US)

(72) Inventors: Tracy A. Propheter-Hinckley, Manchester, CT (US); Raymond Surace, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 712 days.

This patent is subject to a terminal disclaimer.

(21) Appl. No.: 15/863,158

(22) Filed: Jan. 5, 2018

(65) Prior Publication Data

US 2019/0211695 A1     Jul. 11, 2019

(51) Int. Cl.
*B28B 7/18*     (2006.01)
*F01D 5/18*     (2006.01)
*F01D 5/14*     (2006.01)
*F01D 5/28*     (2006.01)
*B28B 7/34*     (2006.01)
*B32B 18/00*    (2006.01)
*B28B 23/00*    (2006.01)
*B28B 23/06*    (2006.01)

(52) U.S. Cl.
CPC ............... *F01D 5/282* (2013.01); *B28B 7/18* (2013.01); *B28B 7/342* (2013.01); *B28B 23/0006* (2013.01); *B32B 18/00* (2013.01); *F01D 5/147* (2013.01); *F01D 5/186* (2013.01); *C04B 2235/6028* (2013.01); *C04B 2237/38* (2013.01); *C04B 2237/62* (2013.01); *F05D 2230/21* (2013.01); *F05D 2240/30* (2013.01); *F05D 2260/201* (2013.01); *F05D 2260/202* (2013.01); *F05D 2300/6033* (2013.01)

(58) Field of Classification Search
None
See application file for complete search history.

(56) References Cited

U.S. PATENT DOCUMENTS 5,186,776 A * 2/1993 Boyce ................ B29C 66/1122
                                                156/73.2
6,627,019 B2   9/2003 Jarmon et al.
(Continued)

FOREIGN PATENT DOCUMENTS

EP        3059390 A1    8/2016

OTHER PUBLICATIONS

U.S. Appl. No. 15/863,160, filed Jan. 2018, Propheter-Hinckley; Tracy A.*

(Continued)

*Primary Examiner* — Alison L Hindenlang
*Assistant Examiner* — Andrés E. Behrens, Jr.
(74) *Attorney, Agent, or Firm* — Bachman & LaPointe, P.C.

(57) ABSTRACT

A method for forming a passage in a ceramic matrix composite component includes forming a core for a ceramic matrix composite component; embedding a hollow member into the core at a desired location for a passage in the ceramic matrix composite component; wrapping the core with a ceramic material; and inserting a rod through the hollow member and into the core.

17 Claims, 12 Drawing Sheets

(56) References Cited

U.S. PATENT DOCUMENTS

| | | | |
|---|---|---|---|
| 8,202,588 | B2 | 6/2012 | Keller et al. |
| 8,216,641 | B2 | 7/2012 | Bouchard et al. |
| 9,161,461 | B2 | 10/2015 | Hurwitz et al. |
| 9,797,263 | B2 | 10/2017 | Varney et al. |
| 10,774,005 | B2 * | 9/2020 | Propheter-Hinckley ..................... F01D 5/187 |
| 2003/0059577 | A1 | 3/2003 | Morrison et al. |
| 2006/0120874 | A1 | 6/2006 | Burke et al. |
| 2006/0121265 | A1 | 6/2006 | Thompson et al. |
| 2008/0025846 | A1 | 1/2008 | Vance et al. |
| 2008/0199661 | A1 | 8/2008 | Keller et al. |
| 2008/0203236 | A1 | 8/2008 | Mazzola et al. |
| 2009/0252917 | A1 * | 10/2009 | Weber ................... B29C 70/086 428/102 |
| 2010/0068034 | A1 | 3/2010 | Schiavo et al. |
| 2016/0115086 | A1 | 4/2016 | Tuertscher et al. |
| 2016/0177743 | A1 | 6/2016 | Thomas et al. |
| 2016/0348511 | A1 * | 12/2016 | Varney ..................... F01D 5/187 |
| 2016/0348515 | A1 * | 12/2016 | Varney ..................... C04B 35/16 |
| 2017/0328217 | A1 | 11/2017 | Gallier et al. |
| 2017/0356296 | A1 | 12/2017 | Tibbott et al. |

OTHER PUBLICATIONS

European Search Report dated Sep. 19, 2019 for related European Patent Application No. 19150594.0.

European Search Report dated Sep. 19, 2019 for corresponding European Patent Application No. 19150605.4.

European Search Report dated May 24, 2019 for corresponding European Patent Application No. 19150605.4.

EP Search Report dated Jun. 9, 2021 issued for corresponding European Patent Application No. 21160328.7.

\* cited by examiner

United States Patent (US 11,125,087 B2)

NEEDLED CERAMIC MATRIX COMPOSITE COOLING PASSAGES

BACKGROUND

The present disclosure relates to ceramic matrix composite components, and more particularly, to a cooling passage therein.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include airfoil cooling that may be accomplished by external film cooling, internal air impingement, and forced convection, either separately, or in combination.

Ceramic matrix composite (CMC) components can endure high temperatures, but those temperatures may be below the gas path operational temperatures of some modern turbine engine stages. Internal convective cooling of CMC components may be primarily from impingement baffle like structures and film cooling from cooling passages. The cooling passages are either drilled using laser or Electron Discharge Machining (EDM). Laser passages are ideal for relatively short passages such as those at the leading edge of an airfoil, while EDM is ideal for long passages such as those at the trailing edge. EDM relies on a current supplied to an electrode which is discharged through a grounded part, however CMC material cannot carry current, and cannot use EDM. Machining cooling passages in the CMC component may result in cut fibers in the CMC material which may weaken the CMC component or expose a surface to environmental attacks.

SUMMARY

A method for forming a passage in a ceramic matrix composite component, according to one disclosed non-limiting embodiment of the present disclosure includes forming a core for a ceramic matrix composite component; embedding a hollow member into the core at a desired location to form a passage in the ceramic matrix composite component; wrapping the core with a ceramic material; and inserting a rod through the hollow member and into the core.

A further aspect of the present disclosure includes a plurality of fibers through which the hollow member extends but does not cut.

A further aspect of the present disclosure includes separating a plurality of fibers around the hollow member.

A further aspect of the present disclosure includes penetrating the ceramic material with the hollow member.

A further aspect of the present disclosure includes that the rod is manufactured of the same material as the core.

A further aspect of the present disclosure includes that the rod is of a desired cooling passage shape.

A further aspect of the present disclosure includes a sharpened end.

A further aspect of the present disclosure includes that the hollow member is a needle.

A further aspect of the present disclosure includes that an inner surface of hollow member is sized to receive the rod.

A further aspect of the present disclosure includes that the hollow member is manufactured of metal.

A further aspect of the present disclosure includes coaxially forming a blind hole in the core for the rod within a blind hole in the core for the hollow member.

A further aspect of the present disclosure includes gluing the rod into the blind hole.

A further aspect of the present disclosure includes removing the hollow member and leaving the rod in the core.

A further aspect of the present disclosure includes removing the core and the rod from the ceramic material.

A further aspect of the present disclosure includes burning out the core and the rod from the ceramic material.

A further aspect of the present disclosure includes forming the hollow member of a nylon.

A further aspect of the present disclosure includes burning out the core, the hollow member, and the rod from the ceramic material.

A ceramic matrix composite component according to one disclosed non-limiting embodiment of the present disclosure includes a ceramic material in which a cooling passage is cast, wherein the cooling passage is cast through a separation of a plurality of ceramic fibers of the ceramic material.

A further aspect of the present disclosure includes that the ceramic matrix composite component is an airfoil of a gas turbine engine.

A further aspect of the present disclosure includes that the ceramic material forms a wall of the airfoil.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
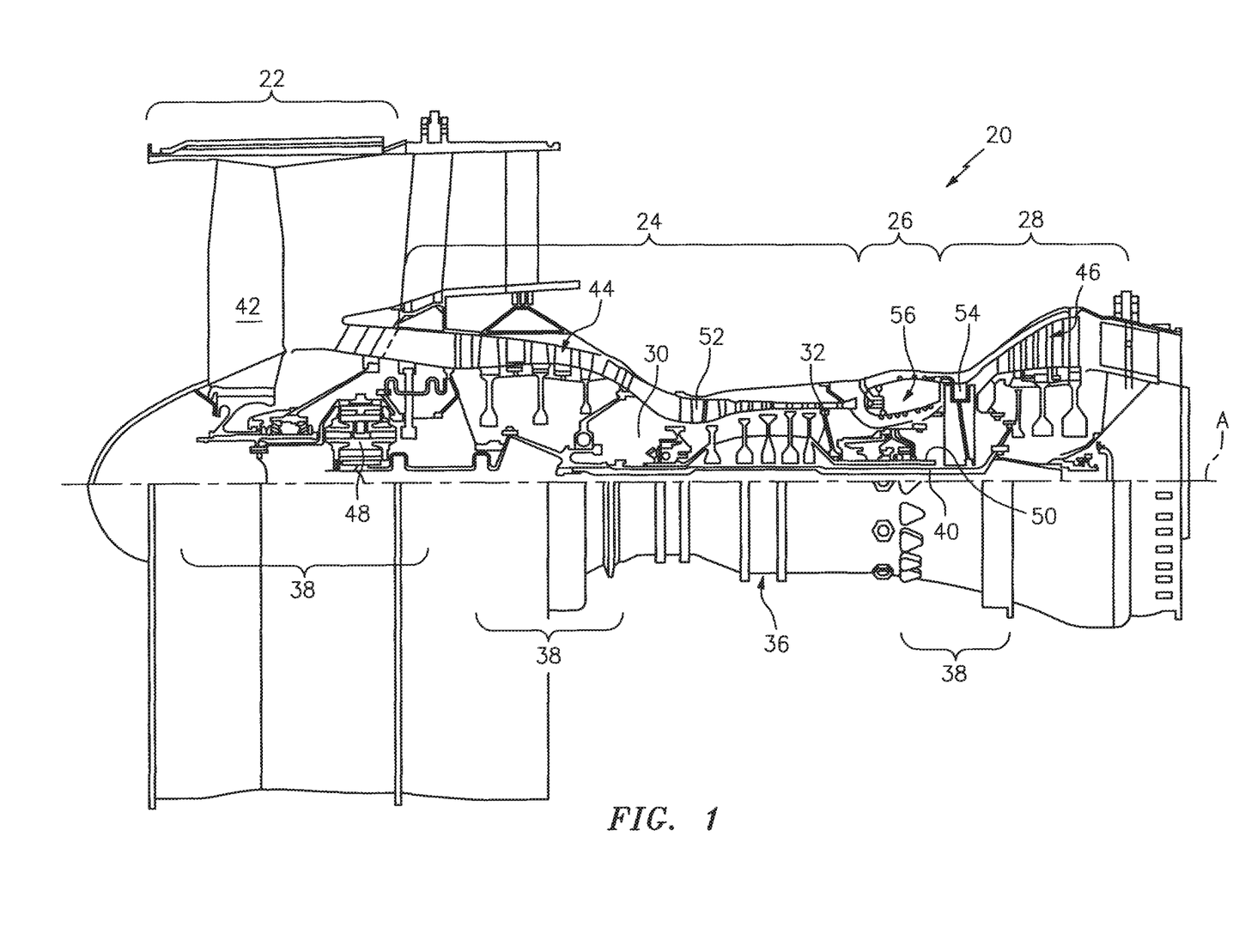
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
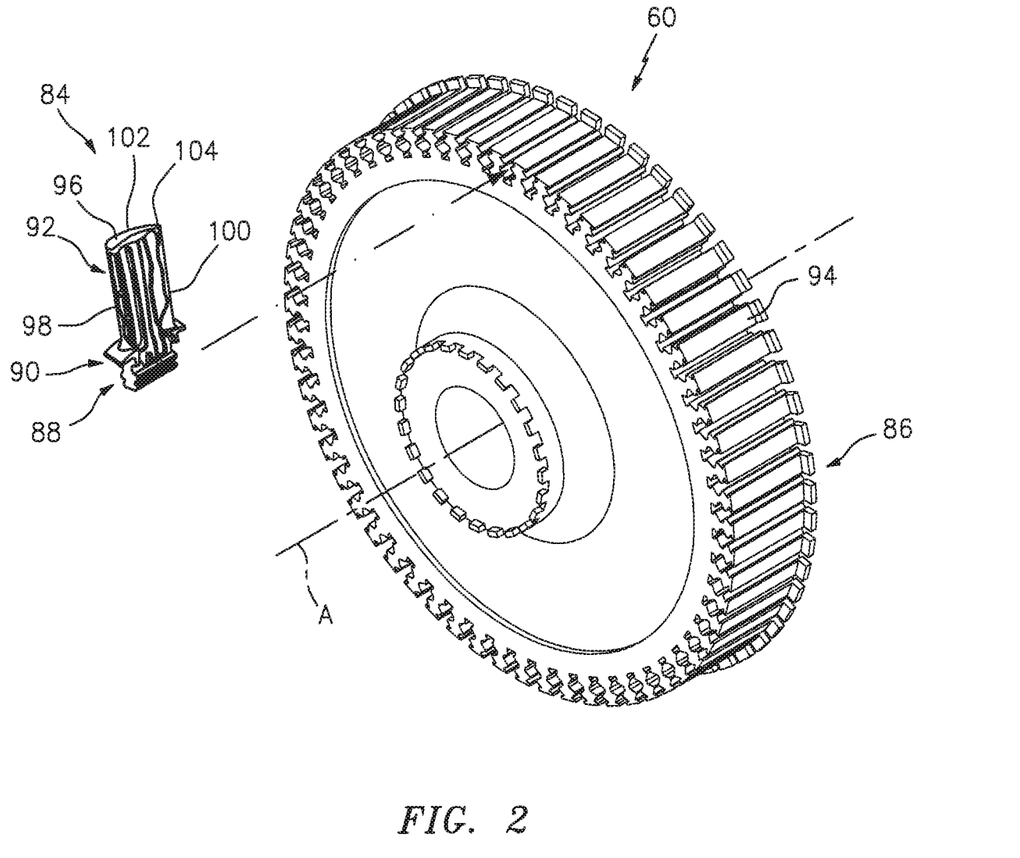
FIG. 2 is an exploded view of rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. Each blade 84 includes a root 88, a platform 90 and an airfoil 92. The blade root 88 is received within a rim 94 of the disk 86 and the airfoil 92 extends therefrom.

The platform 90 separates a gas path side inclusive of the airfoil 92 and a non-gas path side inclusive of the root 88. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Figure 3:
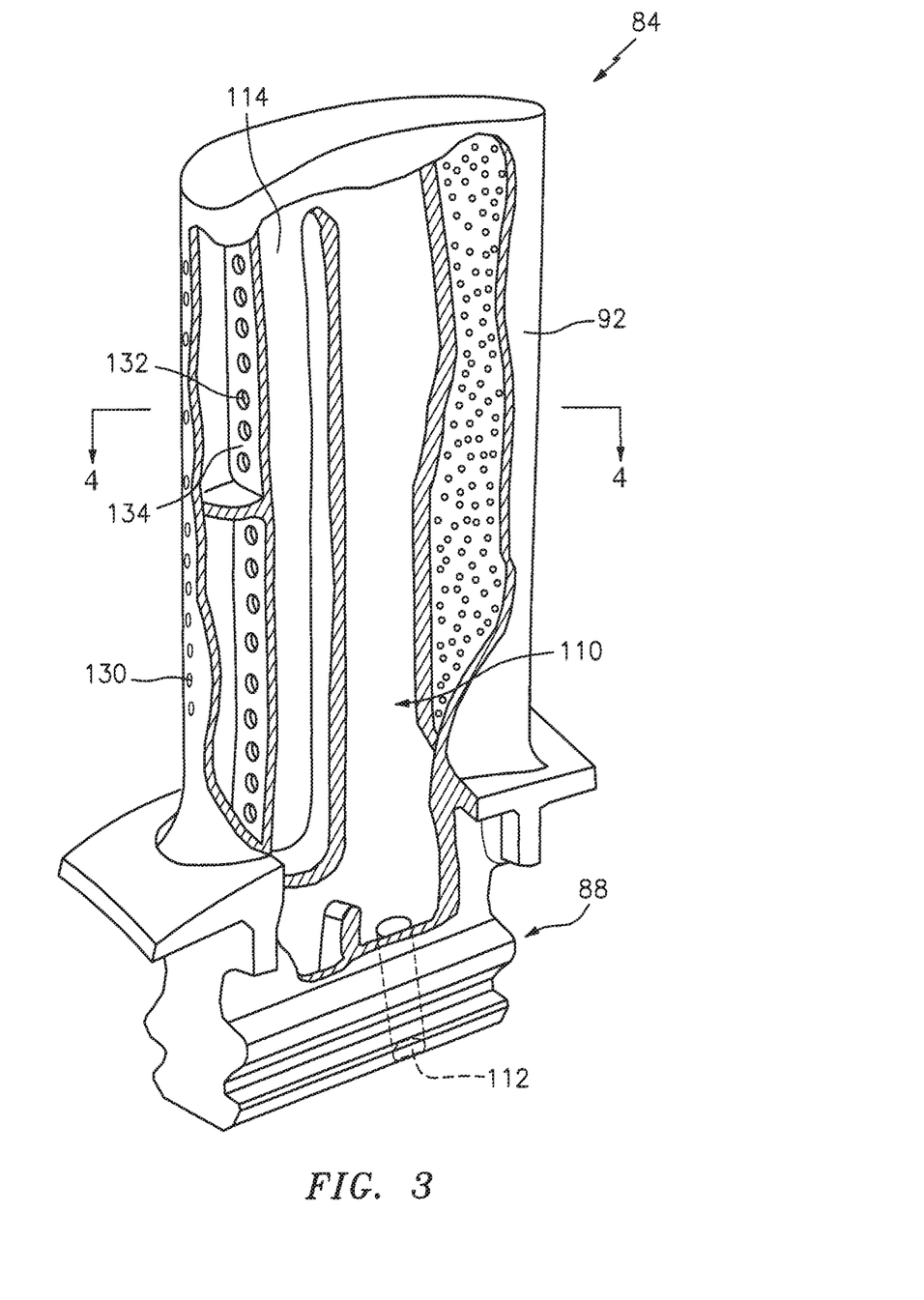
FIG. 3 is a cross-sectional illustration of an example ceramic matrix composite turbine blade of the gas turbine engine.
Figure 4:
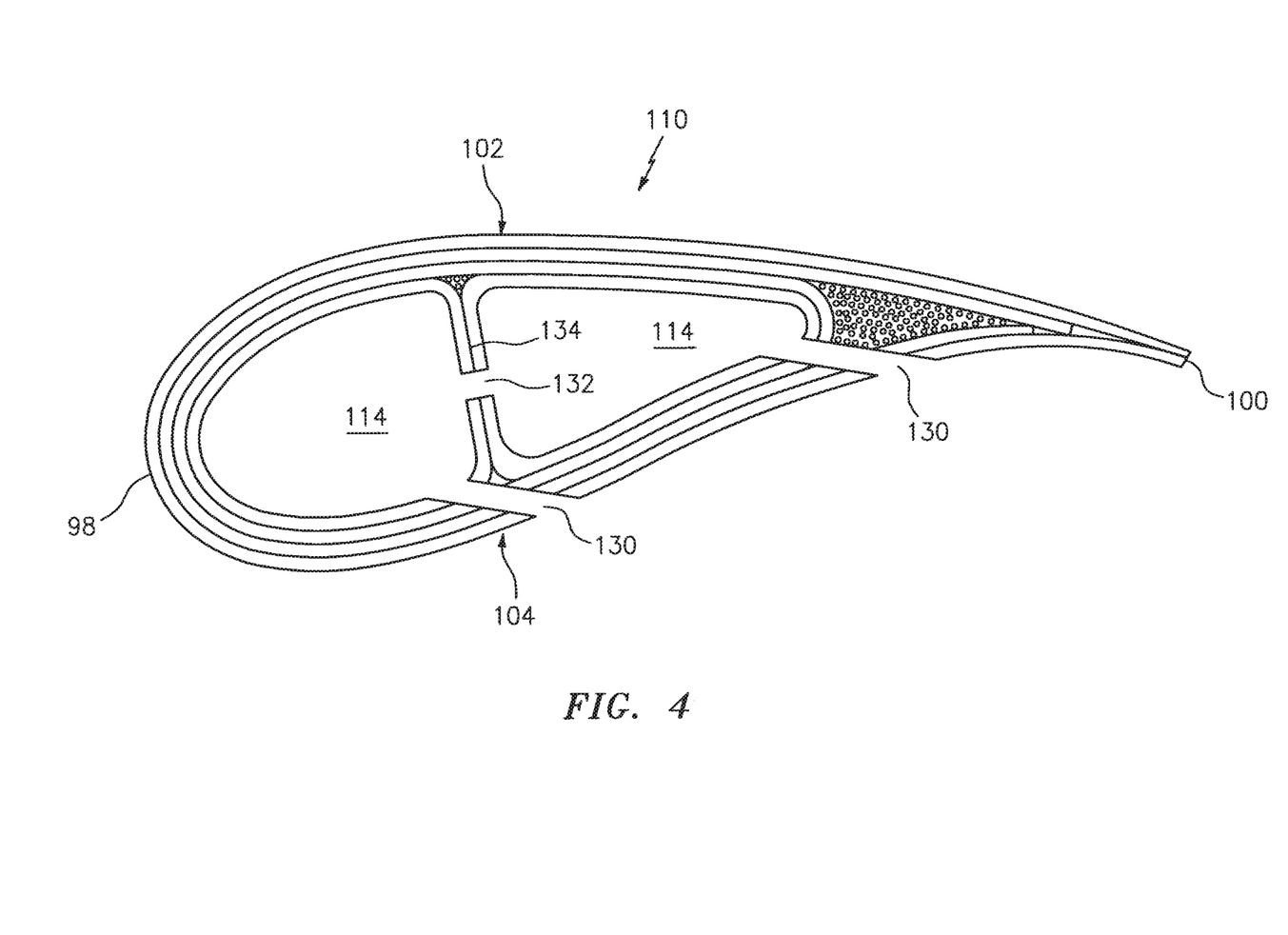
FIG. 4 is a cross-sectional illustration of an example ceramic matrix composite turbine blade taken along line 4-4 in FIG. 3.

With reference to FIG. 3, to resist the high temperature stress environment in the gas path of a turbine engine, each blade 84 includes an array of internal passageways 110. The array of internal passageways 110 includes a multiple of feed passages 112 through the root 88 that communicates airflow into a multiple of cavities 114 (shown schematically) within the airfoil 92. The cavities 114 distribute the cooling flow through passages 130 in the sidewalls 102, 104, leading edge 98, and/or the trailing edge 100 (also shown in FIG. 4). Impingement passages 132 (FIG. 4) may also be located though internal walls 134 between one or more of the array of internal passageways 110. It should be appreciated that various feed architectures, cavities, and passageway arrangements will benefit herefrom.

Figure 5:
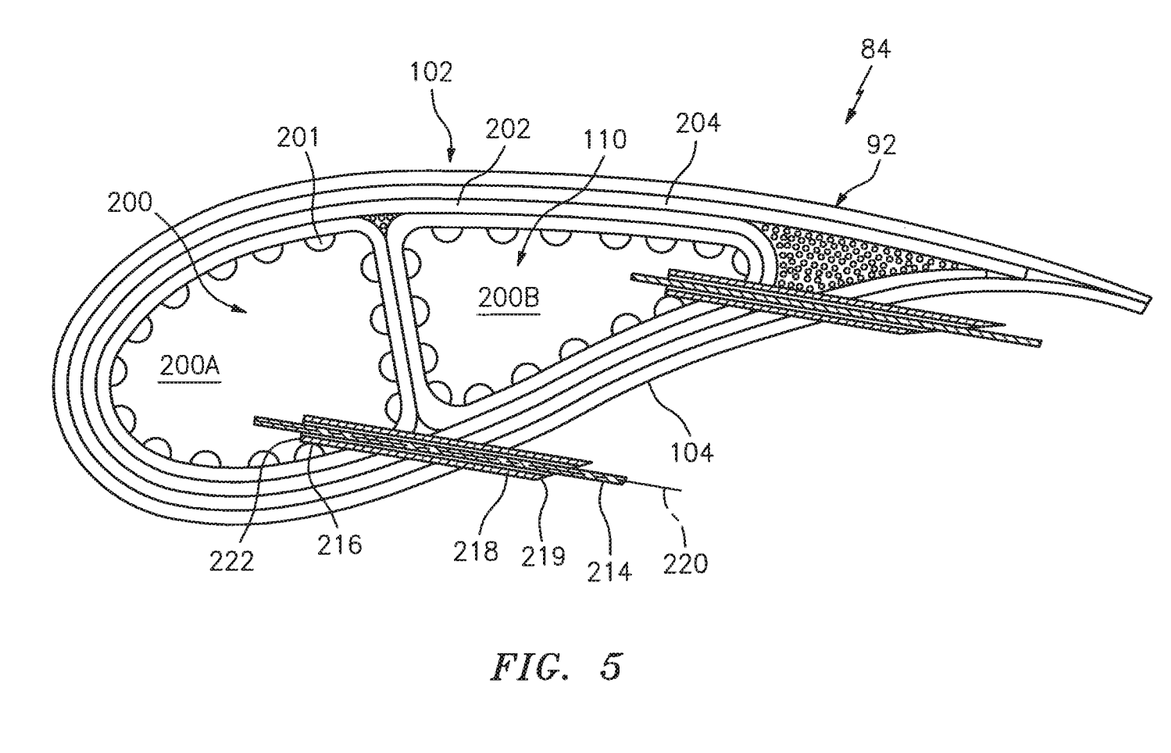
FIG. 5 is a cross-sectional illustration of an example ceramic matrix composite turbine blade taken along line 4-4 in FIG. 3 illustrating formation of a passage in the ceramic matrix composite component according to one disclosed non-limiting embodiment.

With reference to FIG. 5, the example cooled turbine airfoil 84 is manufactured as a CMC component. Though the CMC may have less strength relative to metallic counterparts, CMCs can endure higher material temperatures and are significantly lighter. Although a turbine blade will be used to illustrate the disclosed cooling passage formation method, other components will also benefit herefrom.

The example turbine airfoil 84 is generally formed from a core 200 which may be formed from multiple portions 200A, 200B which are wrapped with a ceramic material 202. The core 200 is later removed such that the cured ceramic material 202 forms the airfoil 92 and the array of internal passageways 110. The core 200 may comprise a material such as carbon. The core 200 is readily cast and/or machined with conventional methods then later removed without damage to the ceramic material 202. The core 200 may include a multiple of longitudinal grooves 201.

The ceramic material 202 may be an arrangement of ceramic fibers 204. Examples of the ceramic material 202 may include a three-dimensional weave of the ceramic fibers 204. Alternatively, or in addition, the ceramic material 202 may include a two-dimensional weave of the ceramic fibers 204. The ceramic material 202 may include multiple layers of two-dimensional weave of the ceramic fibers 204. Alternatively, or in addition, the ceramic material 202 may include a fiber layup, such as a unidirectional layup. In some examples, each of the ceramic fibers 204 may be a bundle and/or a tow of ceramic fibers. The fibers in each bundle or tow may be braided or otherwise arranged. The ceramic fibers 204 may comprise a material that is stable at temperatures above 1000 degrees Celsius. Examples of the ceramic fibers 204 may include fibers of alumina, mullite, silicon carbide, silicon, zirconia or carbon.

Figure 6:
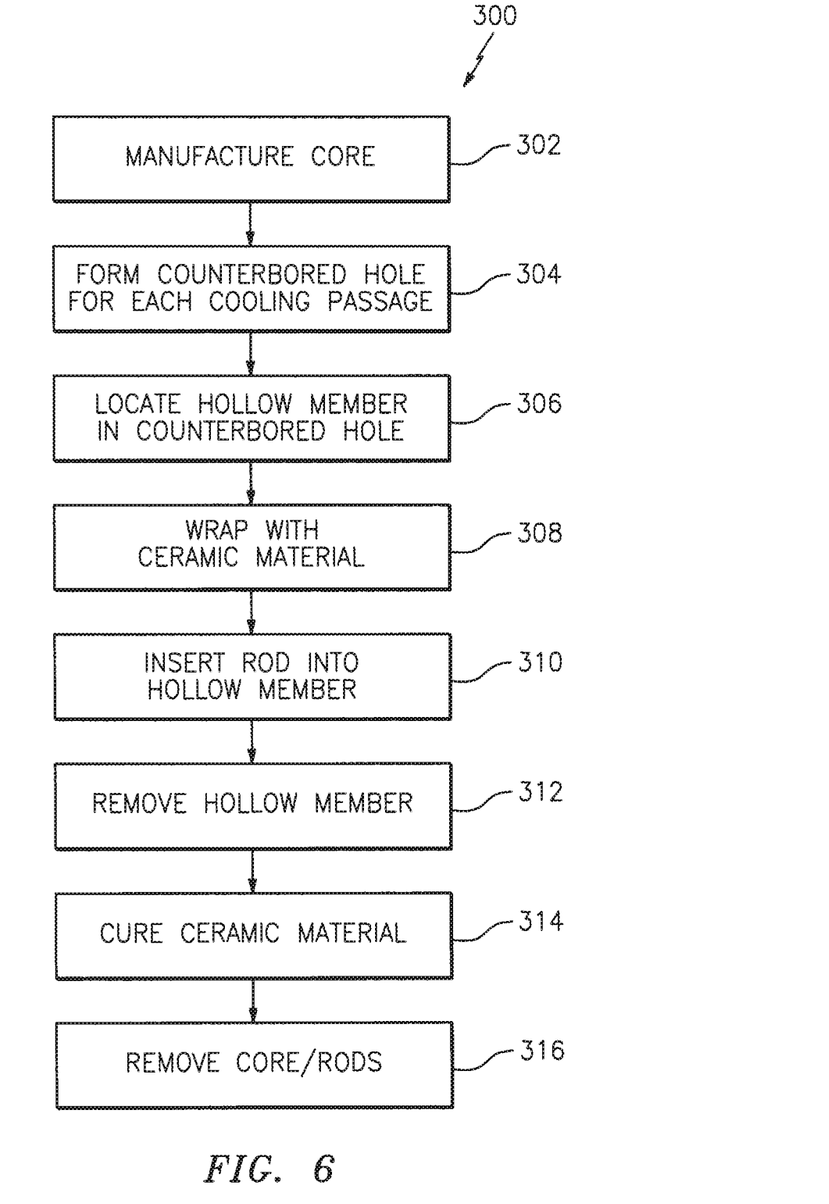
FIG. 6 illustrates a flow diagram of an example method to form a passage in the ceramic matrix composite component according to one disclosed non-limiting embodiment.

With reference to FIG. 6, a method 300 for forming the passages 130 through, for example, the airfoil sidewall 102, 104 (FIG. 4) in a ceramic matrix composite component is illustrated in a schematic block diagram form. It should also be appreciated that application is not limited to aerospace components and various other applications will benefit herefrom.

Figure 7:
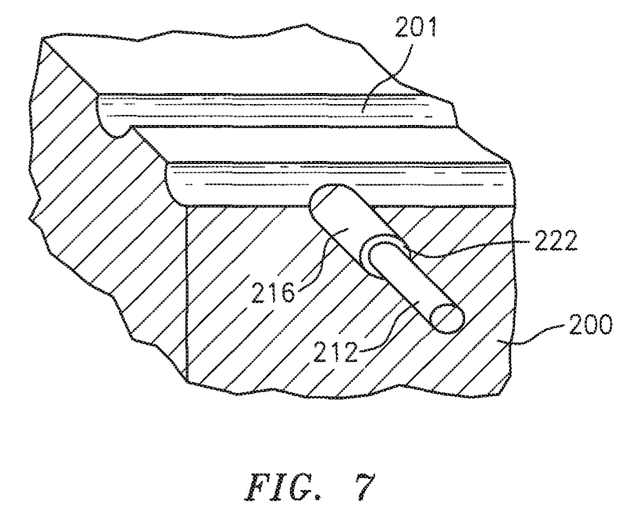
FIG. 7 illustrates a cross-sectional view of a core for a ceramic matrix composite component illustrating a step of the method of FIG. 6 illustrating drilling a counterbored hole.

Once the core 200 is manufactured (302), a counterbored hole 212/216 (FIG. 7) is drilled (304; FIG. 6) at each location in which the passages 130 are to be formed. The counterbored hole 212/216 includes a blind hole 212 for a rod 214 within a blind hole 216 for a hollow member 218 along a common axis 220 (FIG. 5). A step 222 is formed between the blind holes 212, 216 to form a stop for the hollow member 218. Each counterbored hole 212/216 is located and oriented to form the respective passages 130.

Figure 8:
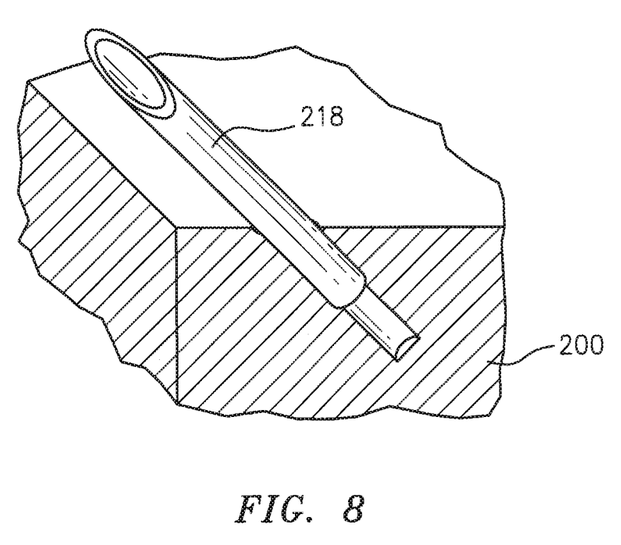
FIG. 8 illustrates a cross-sectional view of a core for a ceramic matrix composite component illustrating a step of the method of FIG. 6 illustrating embedding a hollow member into the core.

Next, the hollow member 218 is located in each blind hole 216 (306, FIG. 6; FIG. 8). The hollow member 218 has an interior diameter equal to or greater to the size of the desired passage 130. The outside diameter may be equal to or slightly smaller than the blind hole 216. The hollow member 218 may include a sharp end 219 to form a hollow needle and may be manufactured of a metal alloy, a nylon, or any other rigid material that is compatible with the CMC material.

Figure 9:
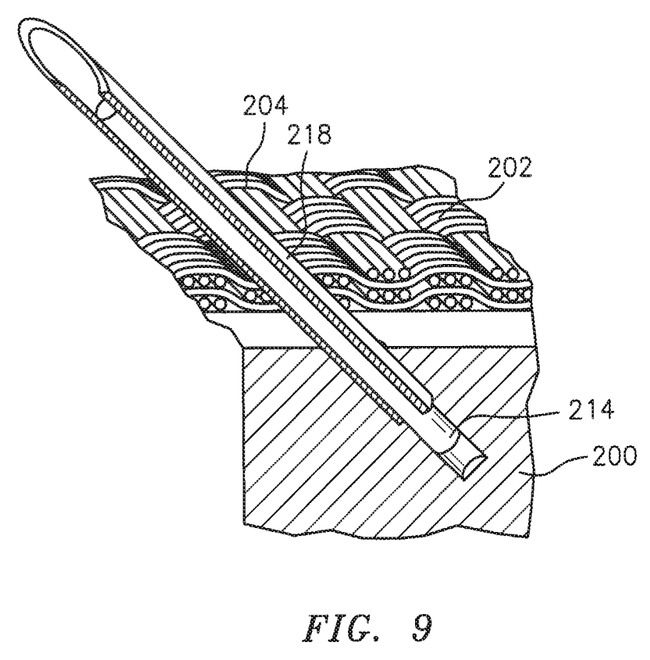
FIG. 9 illustrates a cross-sectional view of a core for a ceramic matrix composite component illustrating a step of the method of FIG. 6 illustrating wrapping with a ceramic material such that the hollow member penetrates therethrough.

Next, the core 200 is wrapped with the ceramic material 202 using the hollow member 218 to pierce through the ceramic material 202 (308, FIG. 6; FIG. 9). The ceramic material 202 comprises the plurality of fibers 204 through which the hollow member 218 extends but does not cut. The hollow members 218 are of a strength to penetrate and separate the plurality of fibers 204.

Figure 10:
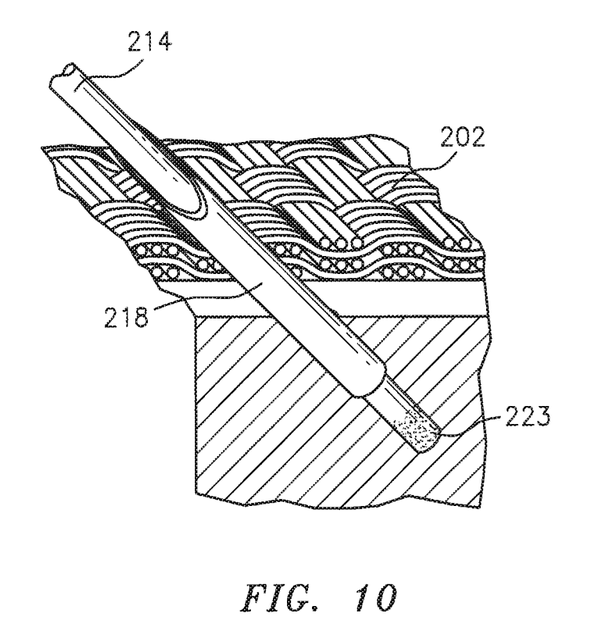
FIG. 10 illustrates a cross-sectional view of a core for a ceramic matrix composite component illustrating a step of the method of FIG. 6 illustrating inserting a rod into the hollow member.

The core 200 is wrapped with the ceramic material 202 to form a ceramic matrix composite body that may be the CMC component in which the passage 130 is to be formed. Alternatively, the ceramic matrix composite body may be a component of the CMC component in which the passage 130 is to be formed. The ceramic matrix composite body may comprise of, for example, a silicon carbide ceramic matrix composite. The ceramic matrix composite body may have any shape or form, not just the shape illustrated. Once all the layers of the ceramic material 202 are in place, one rod 214 is inserted into each hollow member 218 (310, FIG. 6; FIG. 10).

The rod 214 is shaped and sized to form the desired passages 130. The rod 214 may be formed of the same material as the core such as a carbon. The rod 214 may be circular, rectilinear, oval, racetrack, or of other cross-sectional shape. Optionally, each rod 214 may be glued into each blind hole 212 with a glue 223.

Figure 11:
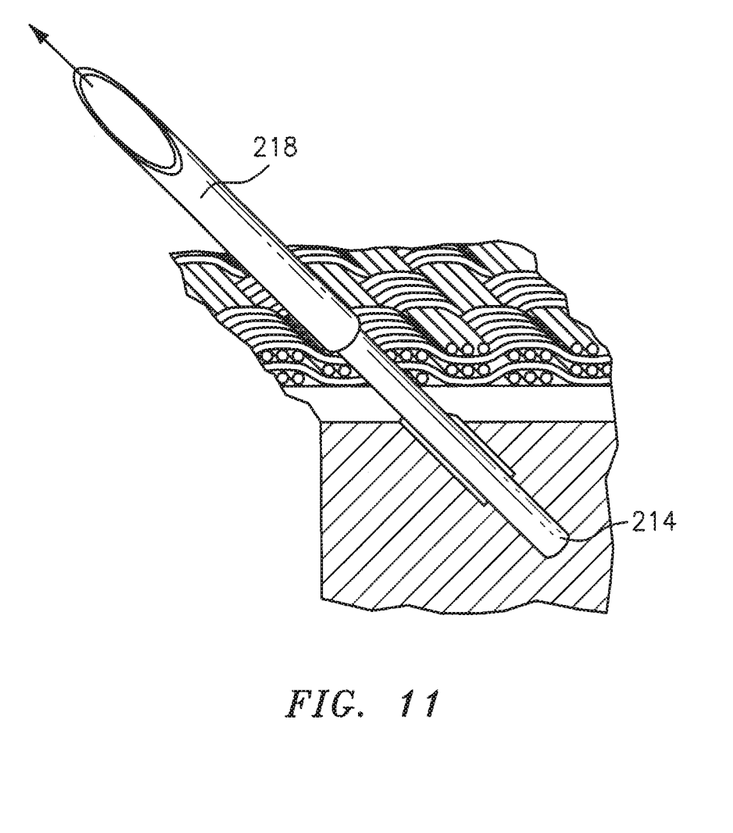
FIG. 11 illustrates a cross-sectional view of a core for a ceramic matrix composite component illustrating a step of the method of FIG. 6 illustrating removing the hollow member.
Figure 12:
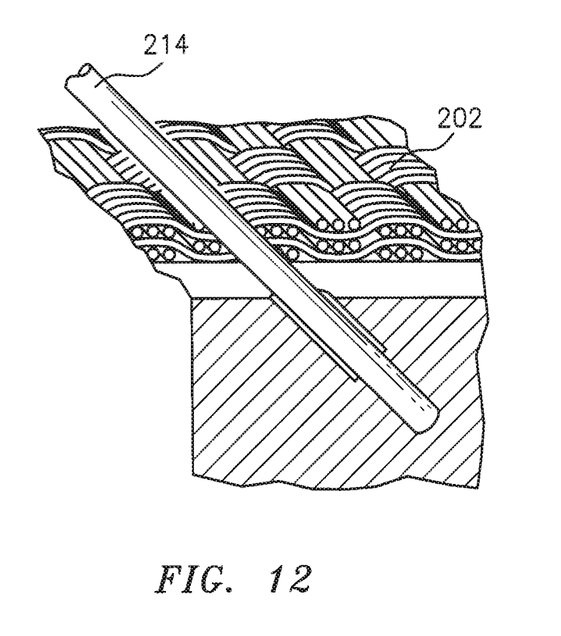
FIG. 12 illustrates a cross-sectional view of a core for a ceramic matrix composite component illustrating a step of the method of FIG. 6 illustrating the ceramic material closing around the rod.

Next, the hollow member 218 is removed (312, FIG. 6; FIG. 11) leaving the rod 214 in place. The ceramic material 202 then closes (FIG. 12) around the rod 214. The ceramic fibers 204 of the ceramic material 202 are not broken in this process, such that it is readily apparent that this method was used because any drilling method would result in the cutting of the ceramic fibers 204. Alternatively, the hollow member 218 can be manufactured of a material such as a nylon which can be readily burned out with the core 200 and then the rod 214 is burned out so that the hollow member need not be removed. That is, the hollow member 218 burns out at a lower temperature than infiltration temps then the rod 214 burns out with the core 200.

Next, the ceramic material 202 is cured (314, FIG. 6) per conventional CMC manufacturing procedures to form the CMC component. Forming the cooled turbine airfoil 84 as the CMC component may include infiltrating a molten metal or alloy into the ceramic material 202. The multiple of longitudinal grooves 201 (FIG. 7) facilitate the infiltration.

The molten metal or alloy fills the gaps between the ceramic fibers 204 and the rods 214. The molten metal or alloy may also react with a reactive element source present in the ceramic material 202 to form the ceramic matrix material. In some examples, a chemical vapor infiltration coating may be applied to the ceramic material 202 prior to the melt infiltration to stiffen the ceramic fibers 204. Alternatively, or in addition, forming the CMC component from the ceramic material 202 may include chemical vapor infiltrating the ceramic material 202 instead of melt infiltrating.

Finally, the core 200 and rods 214 are removed (316, FIG. 6) via heat, acid, or other method which does not harm the ceramic material 202 per conventional CMC manufacturing procedures. Once the core 200 and rods 214 are removed, the passages 130 and the array of internal passageways 114 are formed.

The "cast in" passages 130 are readily identifiable, may be of various cross-sectional shapes, reduce machining time, and facilitate the manufacture of long passages through CMC components such as those through the trailing edge of an airfoil.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A method for forming a passage in a ceramic matrix composite component, the method comprising:
   forming a core for a ceramic matrix composite component;
   embedding a hollow member into the core at a desired location to form a passage in the ceramic matrix composite component;
   wrapping the core with a ceramic material; and
   inserting a rod through the hollow member and into the core.

2. The method as recited in claim 1, wherein the ceramic material comprises a plurality of fibers through which the hollow member extends but does not cut.

3. The method as recited in claim 1, wherein wrapping the core with the ceramic material comprises separating a plurality of fibers around the hollow member.

4. The method as recited in claim 1, wherein wrapping the core with the ceramic material comprises penetrating the ceramic material with the hollow member.

5. The method as recited in claim 1, wherein the rod is manufactured of the same material as the core.

6. The method as recited in claim 1, wherein the rod is of a desired cooling passage shape.

7. The method as recited in claim 1, wherein the hollow member comprises a sharpened end.

8. The method as recited in claim 1, wherein the hollow member is a needle.

9. The method as recited in claim 1, wherein an inner surface of hollow member is sized to receive the rod.

10. The method as recited in claim 1, wherein the hollow member is manufactured of metal.

11. The method as recited in claim 1, further comprising coaxially forming a blind hole in the core for the rod within a blind hole in the core for the hollow member.

12. The method as recited in claim 1, further comprising gluing the rod into a blind hole in the core.

13. The method as recited in claim 1, further comprising removing the hollow member and leaving the rod in the core.

14. The method as recited in claim 13, further comprising removing the core and the rod from the ceramic material.

15. The method as recited in claim 13, further comprising burning out the core and the rod from the ceramic material.

16. The method as recited in claim 1, further comprising forming the hollow member of a nylon.

17. The method as recited in claim 16, further comprising burning out the core, the hollow member, and the rod from the ceramic material.

* * * * *